US010432550B2

(12) United States Patent
Zhang et al.

(10) Patent No.: US 10,432,550 B2
(45) Date of Patent: Oct. 1, 2019

(54) METHOD AND DEVICE FOR COMPUTING RESOURCE SCHEDULING

(71) Applicant: Alibaba Group Holding Limited, Grand Cayman (KY)

(72) Inventors: Yunyang Zhang, Hangzhou (CN); Huining Yan, Hangzhou (CN); Meng Li, Hangzhou (CN); Hongbin Xu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 183 days.

(21) Appl. No.: 15/204,623

(22) Filed: Jul. 7, 2016

(65) Prior Publication Data
US 2017/0012892 A1 Jan. 12, 2017

(30) Foreign Application Priority Data

Jul. 10, 2015 (CN) .......................... 2015 1 0404937

(51) Int. Cl.
| | |
|---|---|
| *G06F 15/16* | (2006.01) |
| *H04L 12/911* | (2013.01) |
| *H04L 29/08* | (2006.01) |
| *G06F 9/455* | (2018.01) |
| *G06F 9/50* | (2006.01) |
| *G06F 15/173* | (2006.01) |
| *H04L 12/915* | (2013.01) |

(52) U.S. Cl.
CPC .......... *H04L 47/70* (2013.01); *G06F 9/45558* (2013.01); *G06F 9/5077* (2013.01); *H04L 67/10* (2013.01); *H04L 67/148* (2013.01); *G06F 2009/4557* (2013.01); *H04L 47/785* (2013.01); *H04L 47/823* (2013.01)

(58) Field of Classification Search
CPC .............................. H04L 67/10; H04L 67/148
USPC .................................................. 709/231, 224
See application file for complete search history.

(56) References Cited

U.S. PATENT DOCUMENTS

| | | | |
|---|---|---|---|
| 7,502,859 B2 | 3/2009 | Inoue et al. | |
| 8,078,708 B1 | 12/2011 | Wang et al. | |
| 8,341,257 B1 | 12/2012 | Wang et al. | |
| 8,347,302 B1 | 1/2013 | Vincent et al. | |

(Continued)

FOREIGN PATENT DOCUMENTS

WO 2013048605 A1 4/2013

OTHER PUBLICATIONS

International Search Report and Written Opinion to corresponding International Application No. PCT/US2016/041426 dated Sep. 14, 2016.

(Continued)

*Primary Examiner* — Karen C Tang
(74) *Attorney, Agent, or Firm* — James J. DeCarlo; Greenberg Traurig, LLP (57) ABSTRACT

A method, apparatus and device for scheduling resources of a cluster comprising a plurality of hosts, each running at least one instance, including acquiring a resource parameter of the cluster; calculating the number of predicted hosts in the cluster according to the resource parameter; determining to-be-migrated hosts and target hosts from the current hosts in the cluster when the number of current hosts in the cluster is greater than the number of predicted hosts; and migrating instances running on the to-be-migrated host to the target host.

19 Claims, 9 Drawing Sheets

(56) References Cited

U.S. PATENT DOCUMENTS

| | | | |
|---|---|---|---|
| 8,429,630 B2 | 4/2013 | Nickolov et al. | |
| 8,612,599 B2 | 12/2013 | Tung et al. | |
| 8,694,644 B2 | 4/2014 | Chen et al. | |
| 8,768,875 B2 | 7/2014 | Xiong et al. | |
| 8,787,154 B1 | 7/2014 | Medved et al. | |
| 8,826,277 B2 | 9/2014 | Chang et al. | |
| 8,898,274 B2 | 11/2014 | Wang et al. | |
| 8,918,784 B1 | 12/2014 | Jorgensen et al. | |
| 8,959,217 B2 | 2/2015 | Mayo et al. | |
| 9,086,929 B2 | 7/2015 | Bailey et al. | |
| 9,135,581 B1 | 9/2015 | Beckford | |
| 9,166,890 B2 | 10/2015 | Maytal et al. | |
| 9,170,849 B2 | 10/2015 | Calder et al. | |
| 9,170,850 B2 | 10/2015 | Heninger et al. | |
| 9,184,989 B2 | 11/2015 | Wang et al. | |
| 9,201,706 B2 | 12/2015 | Heninger et al. | |
| 9,223,634 B2 | 12/2015 | Chang et al. | |
| 9,350,681 B1 | 5/2016 | Kitagawa et al. | |
| 2003/0074606 A1* | 4/2003 | Boker | G06F 11/3495 714/42 |
| 2003/0135458 A1 | 7/2003 | Tadano et al. | |
| 2007/0061464 A1 | 3/2007 | Feng et al. | |
| 2007/0244818 A1 | 10/2007 | Tsuji et al. | |
| 2009/0300173 A1* | 12/2009 | Bakman | G06F 11/008 709/224 |
| 2010/0076856 A1 | 3/2010 | Mullins | |
| 2010/0333116 A1 | 12/2010 | Prahlad et al. | |
| 2011/0016214 A1 | 1/2011 | Jackson | |
| 2011/0126047 A1* | 5/2011 | Anderson | H04L 9/3213 714/15 |
| 2011/0173329 A1* | 7/2011 | Zhang | G06F 1/3206 709/226 |
| 2011/0276772 A1* | 11/2011 | Ohata | G06F 3/0608 711/162 |
| 2012/0036515 A1 | 2/2012 | Heim | |
| 2012/0096468 A1 | 4/2012 | Chakravorty et al. | |
| 2012/0131591 A1* | 5/2012 | Moorthi | G06Q 10/06 718/104 |
| 2012/0166010 A1 | 6/2012 | Chou et al. | |
| 2013/0040681 A1 | 2/2013 | Lee et al. | |
| 2013/0042123 A1* | 2/2013 | Smith | G06F 9/5077 713/300 |
| 2013/0086272 A1 | 4/2013 | Chen et al. | |
| 2013/0124267 A1* | 5/2013 | O'Sullivan | G06Q 30/06 705/7.36 |
| 2013/0212578 A1 | 8/2013 | Garg et al. | |
| 2013/0326507 A1 | 12/2013 | McGrath et al. | |
| 2013/0332588 A1 | 12/2013 | Maytal et al. | |
| 2013/0346969 A1 | 12/2013 | Shanmuganathan et al. | |
| 2014/0019966 A1* | 1/2014 | Neuse | G06F 9/45533 718/1 |
| 2014/0040473 A1 | 2/2014 | Ho et al. | |
| 2014/0207944 A1 | 7/2014 | Emaru | |
| 2014/0250436 A1 | 9/2014 | Tang et al. | |
| 2014/0279201 A1* | 9/2014 | Iyoob | G06Q 30/0631 705/26.7 |
| 2014/0280595 A1 | 9/2014 | Mani et al. | |
| 2014/0310710 A1* | 10/2014 | Lubsey | G06F 9/5011 718/1 |
| 2014/0325503 A1 | 10/2014 | Li | |
| 2014/0337442 A1 | 11/2014 | Zhuang et al. | |
| 2014/0344810 A1 | 11/2014 | Wang | |
| 2015/0039764 A1* | 2/2015 | Beloglazov | H04L 47/70 709/226 |
| 2015/0106811 A1 | 4/2015 | Holler et al. | |
| 2015/0169354 A1* | 6/2015 | Cawlfield | G06F 9/45558 718/104 |
| 2015/0178116 A1* | 6/2015 | Jorgensen | G06F 9/5077 718/1 |
| 2015/0215173 A1 | 7/2015 | Dutta et al. | |
| 2015/0229586 A1* | 8/2015 | Jackson | G06F 9/5027 705/40 |
| 2015/0235308 A1* | 8/2015 | Mick | G06Q 30/08 705/26.3 |
| 2015/0331709 A1* | 11/2015 | Agrawal | G06F 9/45558 718/1 |
| 2016/0013992 A1* | 1/2016 | Reddy | H04L 67/38 709/224 |
| 2016/0179560 A1 | 6/2016 | Ganguli et al. | |
| 2016/0239335 A1* | 8/2016 | Anderson | G06F 9/5088 |
| 2016/0241637 A1* | 8/2016 | Marr | G06F 9/5044 |
| 2016/0378531 A1* | 12/2016 | Dow | G06F 9/45558 718/1 |
| 2018/0012269 A1* | 1/2018 | O'Sullivan | G06Q 30/06 |
| 2018/0077084 A1* | 3/2018 | Johnston | G06F 8/65 |

OTHER PUBLICATIONS

Amazon Web Services (AWS)—Cloud Computing Services, available at http://web.archive.org/web/20150705222223/http://aws/amazon.com/ (Jul. 6, 2015).

Microsoft Azure: Cloud Computing Platform & Services, available at http://web.archive.org/web/20150706050518/http://azure.microsoft.com/en-us/ (Jul. 6, 2015).

Tencent Cloud, available at http://web.archive.org/web/20150706234739/http://www.qcloud.com/ (Jul. 6, 2015).

QingCloud, available at http://web.archive.org/web/20150704215753/https://www.qingcloud.com/ (Jul. 4, 2015).

UCloud—Professional Cloud Computing Providers, available at https://www.ucloud.cn/en/ (available as of Jul. 7, 2015, retrieved Feb. 14, 2017).

Extended European Search Report to corresponding EP Application No. 16824928.2 dated Dec. 19, 2018 (10 pages).

* cited by examiner

METHOD AND DEVICE FOR COMPUTING RESOURCE SCHEDULING

CROSS-REFERENCE TO RELATED APPLICATIONS

This application claims the benefit of priority from Chinese Patent Application No. 201510404937 filed on Jul. 10, 2015, entitled "Method, Apparatus and Equipment for Resource Distribution," which is incorporated herein in its entirety by reference.

BACKGROUND

Field of the Disclosure

The present application relates to the field of cloud computing, and in particular, relates to a method and device for resource scheduling.

Description of the Related Art

Cloud computing is an Internet-based computing approach. Generally, a cloud computing service provider may divide the resources on a host (which may also be referred to as a cloud server) according to different demands of different users, so as to allocate different sizes of resources to different users. The resources may comprise a central processing unit (CPU), a memory, a storage space, and the like. The resources allocated to a user form an instance of the user, which may also be referred to as a virtual machine. Typically, resources on one host may be divided into a plurality of instances for a plurality of users to use.

In the prior art, the cloud computing service provider generally configures a cluster comprising a plurality of hosts. At least one instance of the user runs on each host in the cluster. However, since the resource utilization rates of different instances are different, the resources of the host are not evenly allocated. As a result, the overall utilization rate of the cluster is imbalanced.

SUMMARY

According to some embodiments, the present disclosure provides a method and device for resource scheduling. According to some embodiments, the disclosed methods and devices solve the problem that the overall resource utilization of a cluster is imbalanced in the prior art.

In a non-limiting embodiment of the disclosure, a method for resource scheduling is provided. The method is used for scheduling resources of a cluster comprising a plurality of current hosts, wherein each of the plurality of current hosts runs at least one instance, and the method includes: acquiring a resource parameter of the cluster; calculating a number of predicted hosts in the cluster according to the resource parameter; determining a to-be-migrated host and a target host from the current hosts in the cluster when the number of current hosts in the cluster is greater than the number of predicted hosts; and migrating an instance running on the to-be-migrated host to the target host.

According to another non-limiting embodiment of the disclosure, an apparatus for resource scheduling is provided. The apparatus is used for scheduling resources of a cluster including a plurality of current hosts, wherein each of the plurality of current hosts runs at least one instance, and the apparatus includes: an acquiring unit, configured to acquire a resource parameter of the cluster; a calculating unit, configured to calculate the number of predicted hosts in the cluster according to the resource parameter; a determining unit, configured to determine a to-be-migrated host and a target host from the current hosts in the cluster when the number of current hosts in the cluster is greater than the number of predicted hosts; and a scheduling unit, configured to migrate an instance running on the to-be-migrated host to the target host.

In yet another non-limiting embodiment of the disclosure, a system for resource scheduling is provided, wherein the system includes: a processor; and a memory storing instructions executable by the processor that cause the processor to: acquire a resource parameter of the cluster; calculate the number of predicted hosts in the cluster according to the resource parameter; determine a to-be-migrated host and a target host from the current hosts in the cluster when the number of current hosts in the cluster is greater than the number of predicted hosts; and migrate an instance running on the to-be-migrated host to the target host.

According to some embodiments of the present disclosure, during scheduling of resources in a cluster, by acquiring a resource parameter of the cluster, calculating the number of predicted hosts in the cluster, determining to-be-migrated hosts and target hosts from the current hosts in the cluster when the current number of hosts in the cluster is greater than the number of predicted hosts, and migrating instances running on the to-be-migrated hosts to the target hosts, each target host achieves a maximum improvement on a resource utilization rate, such that the overall resource utilization rate of the cluster is more balanced while the resource demands of the cluster are satisfied with a minimum migration cost.

It shall be appreciated that the above general description and the detailed description hereinafter are only illustrative and interpretative, and are not intended to limit the present disclosure.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The terminology used in the present application is for the purpose of describing particular embodiments, and is not intended to limit the scope of the present disclosure, which is defined by the appended claims. As used in the present application and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

Figure 1:
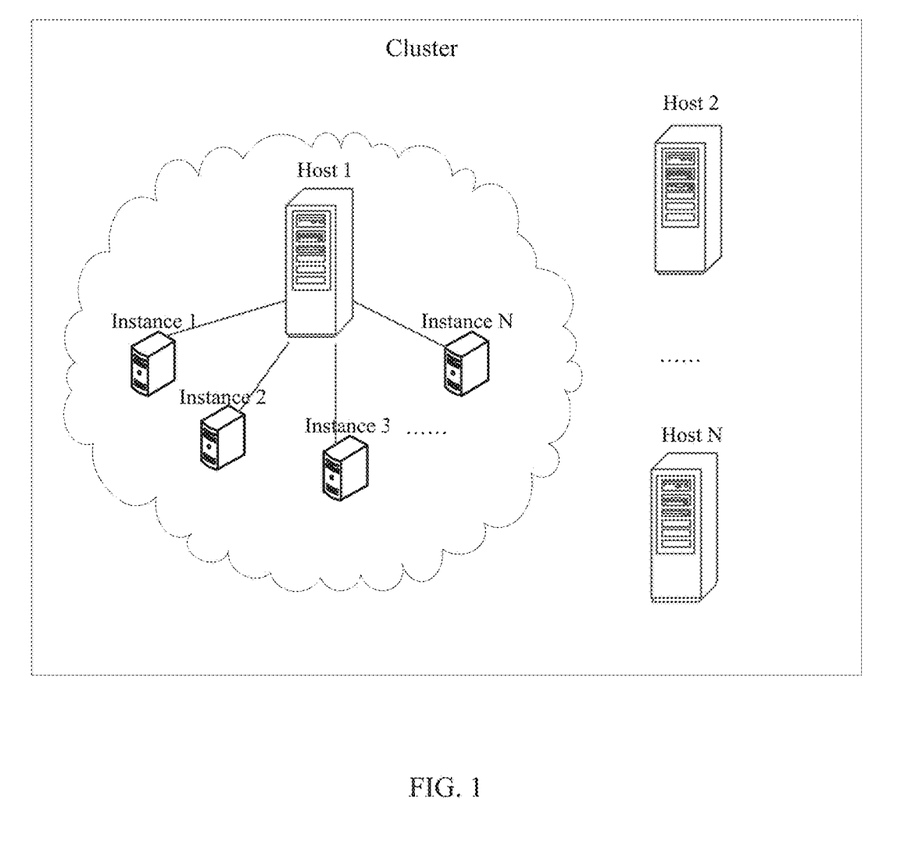
FIG. 1 is a schematic structural diagram illustrating architecture of a cloud system for resource scheduling according to certain embodiments of the disclosure.

It shall be understood that, although the terms first, second, third, etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to determining" or "in response to detecting" depending on the context. FIG. 1 is a schematic structural diagram illustrating an architecture of a cloud system for resource scheduling according to certain embodiments of the disclosure.

The architecture of the cloud system as illustrated in FIG. 1 is described by using one cluster as an example. In practical application, a cloud computing server provider may be configured with a plurality of clusters. The cluster as illustrated in FIG. 1 includes M hosts. The resources on each host can be described by using storage space as an example. The resources on each host can be allocated to different users. Using host 1 as an example, the storage space on host 1 is divided into N parts, which are provided to N users. The resource allocated to each user from host 1 is referred to as an instance of the user. As illustrated in FIG. 1, N instances, for example, can run on host 1.

With reference to FIG. 1, according to some embodiments of the present disclosure, during scheduling of resources in a cluster, by acquiring a resource parameter of the cluster, calculating the number of predicted hosts in the cluster, determining one or more to-be-migrated hosts and one or more target hosts from the current hosts in the cluster when the current number of hosts in the cluster is greater than the number of predicted hosts, and migrating instances running on the to-be-migrated hosts to the target hosts, each target host achieves the maximum improvement on its resource utilization rate, such that the overall resource utilization rate of the cluster is more balanced while the resource demands of the cluster are satisfied with a minimum migration cost. The present disclosure is described in further detail hereinafter with reference to a number of specific, interchangeable embodiments.

Figure 2:
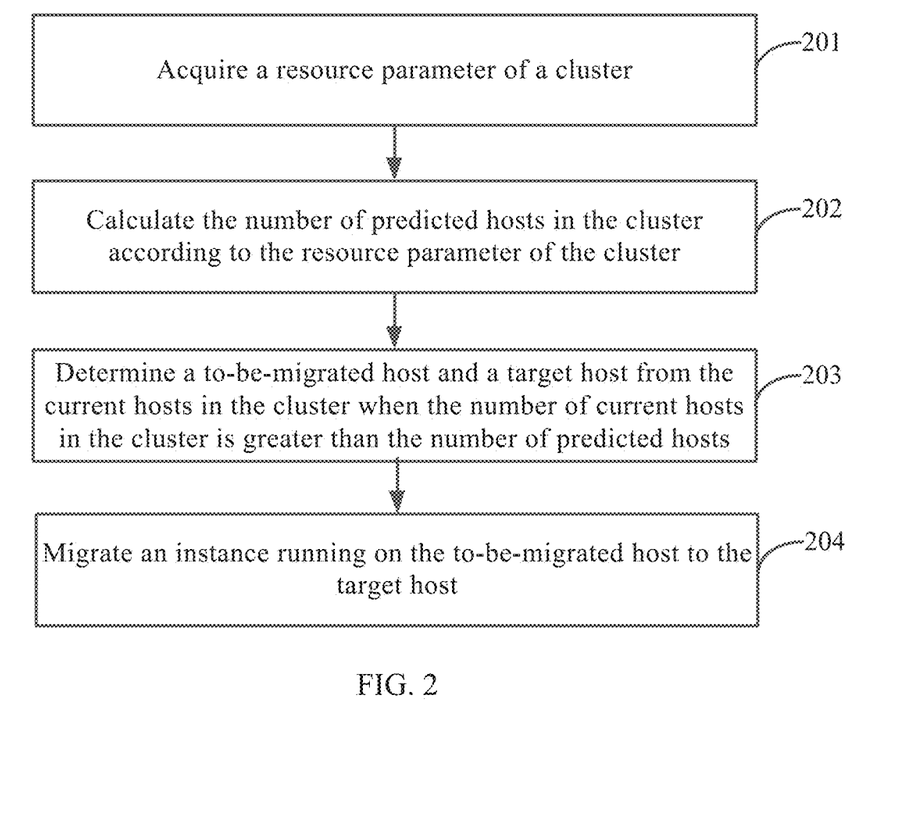
FIG. 2 is a flow diagram illustrating a method for resource scheduling according to certain embodiments of the disclosure.

FIG. 2 is a flow diagram illustrating a method for resource scheduling according some embodiments of the disclosure.

At step S201, a resource parameter of the cluster is acquired. The resource parameter of the cluster in this step may include, for example, a resource configuration quantity of the host and actual resource utilization quantities of the instances running on the host.

To ensure consistency of the hosts in the cluster, generally the hosts in the cluster have the same resource configuration quantity. The resource configuration quantity is an inherited configuration parameter of the host. According to the resource types, the resource configuration quantity may comprise a CPU parameter, a memory capacity, a storage space capacity, and the like. When the resources of the cluster need to be scheduled, the configuration parameter of the hosts in the cluster may be directly collected as the resource configuration quantity.

Corresponding to different types of resources on the hosts, the actual resource utilization quantity of each instance running on each host may be collected. For example, an actual storage space utilization quantity, an actual memory utilization quantity, and the like, of each instance may be collected.

At step S202, the number of predicted hosts in the cluster is calculated according to the resource parameter of the cluster.

With respect to the resource configuration quantity of the host and the actual resource utilization quantity of the instances running on the host that are acquired in step S201, in this step, a predicted resource utilization quantity of each instance may be acquired by performing a linear regression analysis on the actual resource utilization quantity of each instance. Linear regression analysis is a mathematical statistics approach, and is an analytical method to determine a mutually-dependent quantitative relationship between two or more variables. In these embodiments, by means of the linear regression analysis, a maximum value of the resource utilization quantity in a prospective month, for example, may be predicted according to the resource utilization quantity of the instance on each day within a past month, for example, and used as the predicted resource utilization quantity of the instance.

After the predicted resource utilization quantity of each instance is acquired, a sum of the predicted resource utilization quantities of all the instances on each host may be used as the predicted resource utilization quantity of each host. A sum of the predicated resource utilization quantity of all the hosts in the cluster may be calculated, and then used as the predicted resource utilization quantity of the cluster. Next, the number of predicted hosts in the cluster is calculated according to the resource configuration quantities of the hosts and the predicted resource utilization quantity of the cluster. Still using storage space as an example, assume that the storage space of a host is 128 GB and a predicted storage space utilization quantity of the cluster is 300 GB, in order to satisfy the 300 GB storage space utilization quantity, at least three hosts are needed, and the number of predicted hosts in the cluster is 3.

At step S203, to-be-migrated hosts and target hosts are determined from the current hosts in the cluster when the number of current hosts in the cluster is greater than the number of predicted hosts.

The current number of hosts in the cluster is the number of hosts online in the cluster. When the current number of hosts is greater than the number of predicted hosts calculated in step S202, one or more of the hosts in the cluster are redundant, and host resources may be scheduled. In this case, a difference between the current number of hosts in the cluster and the number of predicted hosts may be calculated, and the difference may be used as a number of to-be-migrated hosts in the cluster.

Next, a migration cost value of each host in the cluster may be determined. For example, the number of instances running on each host and the total storage space of each instance may be acquired, a notification migration cost value of each host may be calculated according to the number of instances, a data migration cost value of all the instances on each host may be calculated according to the total storage space, and a sum of the notification migration cost value and the data migration cost value is used as the migration cost value of each host. Finally, the calculated number of to-be-migrated hosts is acquired according to an order of the migration cost values, and a same number of remaining hosts as the number of predicted hosts are used as the target hosts.

In step S204, instances running on the to-be-migrated hosts are migrated to the target hosts.

After the to-be-migrated hosts and the target hosts are determined, the to-be-migrated instances running on the to-be-migrated hosts may be sequenced in a descending order of the predicted resource utilization quantities of the instances. To-be-migrated instances may be sequentially migrated to a target migration host in the target hosts according to the sequence, wherein the target migration host is a target host whose predicted resource utilization quantity achieves a maximum improvement after the to-be-migrated instance is migrated. The predicted resource utilization rate is a ratio of the predicted resource utilization quantity on the target host to the resource configuration quantity. The improvement of the predicted resource utilization rate is an improvement in the proportion of the predicted resource utilization rate of the host after a to-be-migrated instance is migrated to the target host.

As seen from the above, in these embodiments, by acquiring a resource parameter of the cluster, calculating the number of predicted hosts in the cluster, determining to-be-migrated hosts and target hosts from the current hosts in the cluster when the current number of hosts in the cluster is greater than the number of predicted hosts, and migrating instances running on the to-be-migrated hosts to the target hosts, each target host achieves a maximum improvement on resource utilization rate, such that the overall resource utilization rate of the cluster is more balanced while the resource demands of the cluster are satisfied with a minimum migration cost.

Figure 3:
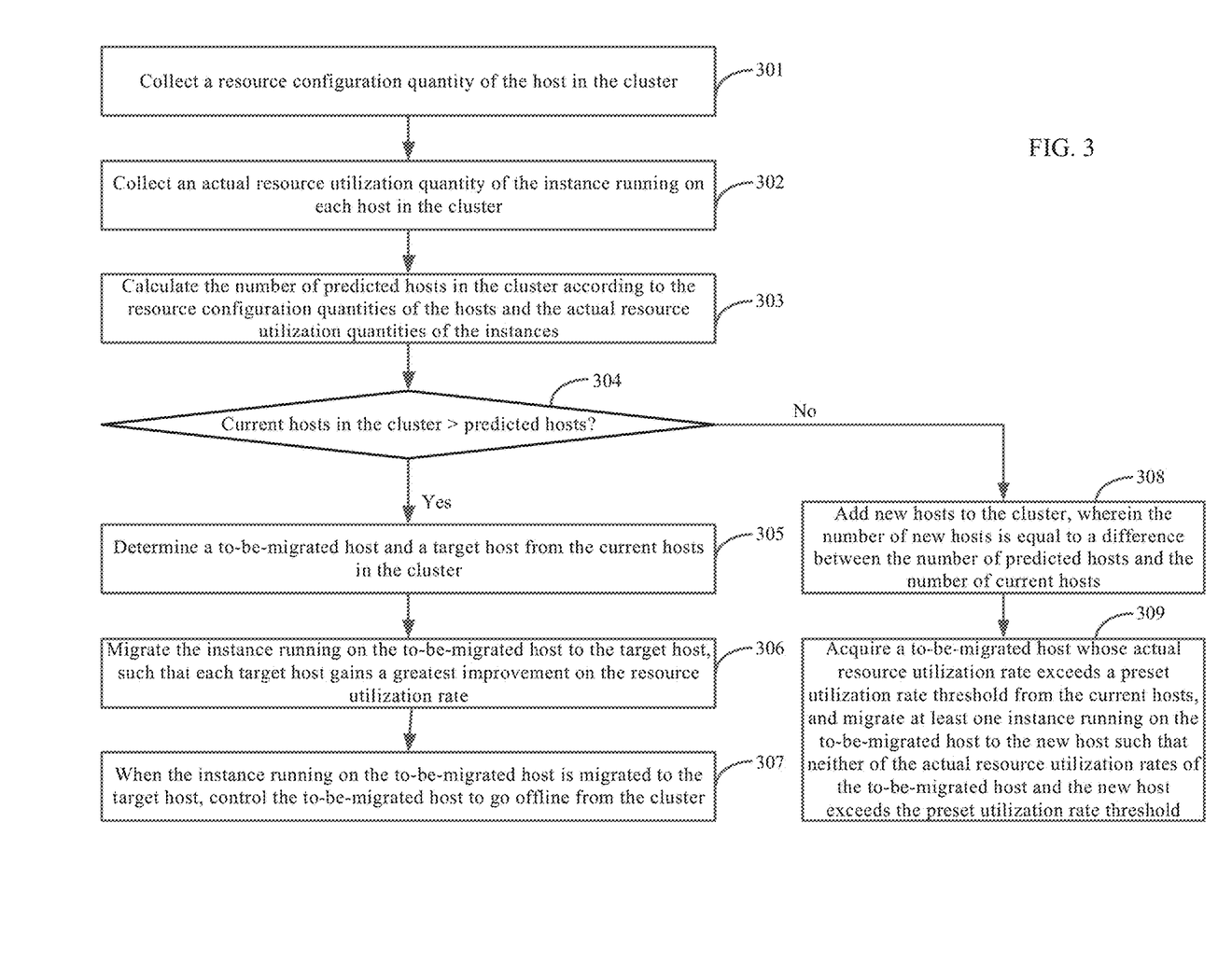
FIG. 3 is a flow diagram illustrating a method for resource scheduling according to certain embodiments of the disclosure.

FIG. 3 is a flow diagram illustrating a method for resource scheduling according to some embodiments of the disclosure. Resource scheduling is described in detail in these embodiments.

At step S301, a resource configuration quantity of the host in the cluster is collected.

To ensure consistency of the hosts in the cluster, generally the hosts in the cluster have the same resource configuration quantity. The resource configuration quantity is an inherited configuration parameter of the host, generally referring to a hardware configuration parameter. According to the resource types, the resource configuration quantity may comprise a CPU parameter, a memory capacity, a storage space capacity, and the like. When the resources of the cluster need to be scheduled, the configuration parameter of the hosts in the cluster may be directly collected as the resource configuration quantity.

At step S302, an actual resource utilization quantity of the instance running on each host in the cluster is collected.

Corresponding to different types of resources on the hosts, the actual resource utilization quantity of each instance running on each host may be collected. For example, an actual storage space utilization quantity, an actual memory utilization quantity, and the like, of each instance may be collected.

At step S303, the number of predicted hosts in the cluster is calculated according to the resource configuration quantities of the hosts and the actual resource utilization quantities of the instances.

With respect to the resource configuration quantity of the host and the actual resource utilization quantity of the instances running on the host that are acquired in step S301 and step S302, respectively, in this step, a predicted resource utilization quantity of each instance may be acquired by performing a linear regression analysis on the actual resource utilization quantity of each instance. Using storage space utilization as an example, a storage space utilization on each day within a past one month may be acquired, and a linear regression analysis may be performed on the acquired storage space utilization to calculate a maximum value of the storage space utilization in a prospective month. The maximum value may be used as the predicted storage space utilization quantity of the instance. Using memory utilization as another example, a memory utilization on each day within a past month may be acquired, and a linear regression analysis may be performed on the acquired memory utilization to calculate a maximum value of the memory utilization in a prospective month. The maximum value may be used as the predicted memory utilization quantity of the instance.

After the predicted resource utilization quantity of each instance is acquired, a sum of the predicted resource utilization quantities of all the instances on each host may be used as the predicted resource utilization quantity of each host. A sum of the predicated resource utilization quantities of all the hosts in the cluster may be calculated and then used as the predicted resource utilization quantity of the cluster. Next, the number of predicted hosts in the cluster is calculated according to the resource configuration quantities of the hosts and the predicted resource utilization quantities of the cluster. Still using storage space as an example, assume that the storage space of a host is 128 GB and a predicted storage space utilization quantity of the cluster is 300 GB. In order to satisfy the 300 GB storage space utilization quantity, at least three hosts are needed, and the number of predicted hosts in the cluster is 3. It should be noted that when there are a plurality of resource types, the number of predicted hosts may be calculated with respect to each resource type, and a maximum number may be selected from a plurality of predicted numbers of hosts as the number of predicted hosts in the cluster. For example, if the number of predicted hosts acquired according to the storage space is 3, the number of predicted hosts acquired according to the CPU is 2, and the number of predicted hosts acquired according to the memory is 4, then it is determined that the number of predicted hosts in the cluster is 4.

At step S304, it is determined whether the current number of hosts in the cluster is greater than the number of predicted hosts. If the current number of hosts is greater than the number of predicted hosts, then step S305 is performed; otherwise, step S308 is performed.

In these embodiments, the current number of hosts in the cluster is the number of all hosts online in the cluster. When the current number of hosts is greater than the number of predicted hosts calculated in step S303, one or more hosts in the cluster are redundant, and the host resources may be scheduled. When the current number of hosts is smaller than the number of predicted hosts, the hosts in the cluster are insufficient, and new hosts need to be added.

At step S305, the to-be-migrated hosts and the target hosts are determined from the current hosts in the cluster.

When it is judged that the number of current hosts is greater than the number of predicted hosts, the difference between the number of current hosts in the cluster and the number of predicted hosts may be calculated. The difference may be used as the number of to-be-migrated hosts in the cluster. Next, a migration cost value of each host in the cluster may be determined. For example, the number of instances running on each host and the total storage space of each instance may be acquired, a notification migration cost value of each host may be calculated according to the number of instances, a data migration cost value of all the instances running on each host may be calculated according to the total storage space, and a sum of the notification migration cost value and the data migration cost value may be used as the migration cost value of each host.

In an example of calculating the migration cost value of a host, the notification cost and data migration cost may be firstly determined, wherein the notification cost is the manpower cost consumed to notify the user corresponding to each to-be-migrated instance of a migration event, and the data migration cost is a sum of the network traffic transmission cost consumed to migrate each 1 GB of data and the loss cost caused due to input/output (I/O) operations performed for the hard disk when reading and writing data in the process of migrating the data on the to-be-migrated host to the target host. Assume that the notification cost is 1 yuan/instance, the number of instances is b, the data migration cost is c yuan/GB and the total storage space is d GB, then the migration cost of the host is $a*b+c*d$.

After the migration cost value of each host is determined, the to-be-migrated hosts may be acquired according to an order of the migration cost values. The number of acquired to-be-migrated hosts is the above calculated number of to-be-migrated hosts. Then, the remaining hosts are used as the target hosts, wherein the number of target hosts is consistent with the number of predicted hosts.

At step S306, the instances running on the to-be-migrated hosts are migrated to the target hosts, such that each target host achieves a maximum improvement on the resource utilization rate.

After the to-be-migrated hosts and the target hosts are determined, the to-be-migrated instances running on the to-be-migrated host may be sequenced in a descending order of the predicted resource utilization quantities of the instances. To-be-migrated instances may be sequentially migrated to a target migration host in the target hosts according to the sequence, wherein the target migration host is a target host whose predicted resource utilization quantity achieves maximum improvement after the to-be-migrated instance is migrated to the target host. The predicted resource utilization rate of the target host is a ratio of the predicted resource utilization quantity on the target host to the resource configuration quantity. The improvement of the predicted resource utilization rate is an improvement in the proportion of the predicted resource utilization rate of the host after a to-be-migrated instance is migrated to the target host.

In some embodiments of the disclosure, to ensure normal running of each host, a resource utilization rate threshold may be preset for the host to ensure that the actual resource utilization rate of the host is smaller than the preset utilization rate threshold. Therefore, in these embodiments, with respect to the target hosts, the actual resource utilization rate of each target host may be calculated in advance, the target host whose actual resource utilization rate exceeds the preset utilization rate threshold is determined as a first target host, and the remaining target hosts are determined as second target hosts; a first to-be-migrated instance is acquired from the first target host, such that the actual resource utilization rate of the first target host when the first to-be-migrated instance is migrated is smaller than the preset utilization rate threshold; and the first to-be-migrated instance is migrated to the second target host, such that the second target host achieves maximum improvement rate on the resource utilization rate.

At step S307, after the instances running on the to-be-migrated host are migrated to the target host, the to-be-migrated host is controlled to go offline. Then, the method ends.

At step S308, new hosts are added to the cluster, wherein the number of new hosts is equal to the difference between the number of predicted hosts and the number of current hosts.

When it is determined that the number of current hosts is smaller than the number of predicted hosts, the difference between the number of predicted hosts in the cluster and the number of current hosts may be calculated and then used as the number of new hosts to be added to the cluster.

At step S309, a to-be-migrated host whose actual resource utilization rate exceeds a preset utilization rate threshold is acquired from the current hosts in the cluster, and at least one instance running on the to-be-migrated host is migrated to the new host such that neither of the actual resource utilization rates of the to-be-migrated host and the new host exceeds the preset utilization rate threshold. Then, the method ends.

As seen from the above, in these embodiments, by acquiring a resource parameter of the cluster, calculating the number of predicted hosts in the cluster, determining to-be-migrated hosts and target hosts from the current hosts in the cluster when the current number of hosts in the cluster is greater than the number of predicted hosts, and migrating instances running on the to-be-migrated hosts to the target hosts, each target host achieves maximum improvement on resource utilization rate, such that the overall resource utilization rate of the cluster is more balanced while the resource demands of the cluster are satisfied with a minimum migration cost.

Corresponding to the embodiments illustrating the method for resource scheduling according to the present application, the present application further provides embodiments illustrating an apparatus and device for resource scheduling.

Figure 4:
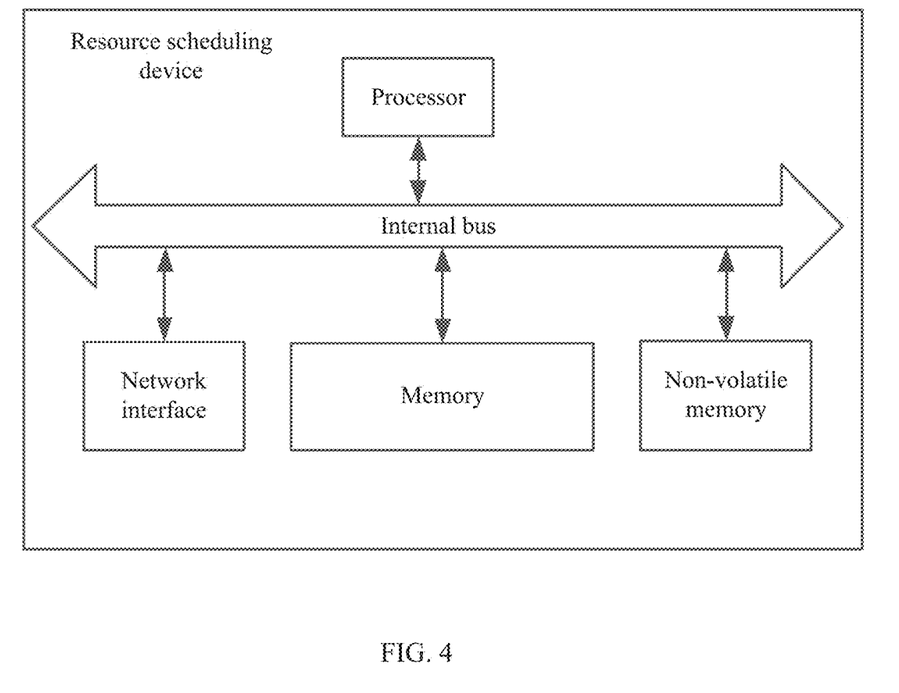
FIG. 4 is a schematic structural diagram illustrating hardware of a device for resource scheduling according to certain embodiments of the disclosure.

The embodiment illustrating the device for resource scheduling is used for describing scheduling of resources of a cluster comprising a plurality of hosts, wherein at least one instance runs on each of the plurality of hosts. The apparatus embodiment may be practiced via software, or may be practiced via a combination of hardware and software. Using practice via the software as an example, as a logical apparatus, the apparatus for resource scheduling is formed by reading the corresponding computer program instructions from a non-volatile memory to a memory for execution by using a processor of the device where the apparatus is configured. From the perspective of hardware, FIG. 4 is a schematic structural diagram illustrating hardware of a device where the apparatus for resource scheduling is configured according to the present application. In addition to the processor, memory, network interface, and the non-volatile memory illustrated in FIG. 4, the device where the apparatus according to the embodiment is configured may typically further comprise other hardware according to the actual functions of the device, which is not further listed in FIG. 4.

Figure 5:
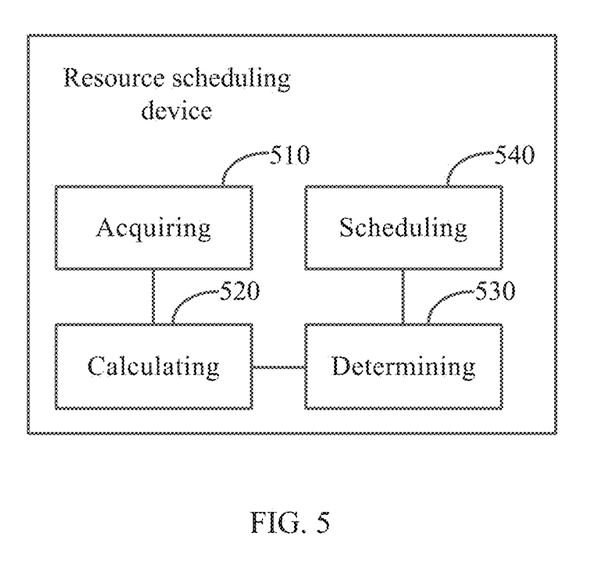
FIG. 5 is a block diagram illustrating a device for resource scheduling according to certain embodiments of the disclosure.

FIG. 5 is a block diagram illustrating an apparatus for resource scheduling according to some embodiments of the disclosure. The apparatus includes an acquiring unit 510, a calculating unit 520, a determining unit 530, and a scheduling unit 540.

The acquiring unit 510 is configured to acquire a resource parameter of the cluster.

The calculating unit 520 is configured to calculate the number of predicted hosts in the cluster according to the resource parameter.

The determining unit 530 is configured to determine a to-be-migrated host and a target host from the current hosts in the cluster when the number of current hosts in the cluster is greater than the number of predicted hosts.

The scheduling unit 540 is configured to migrate an instance running on the to-be-migrated host to the target host.

Figure 6:
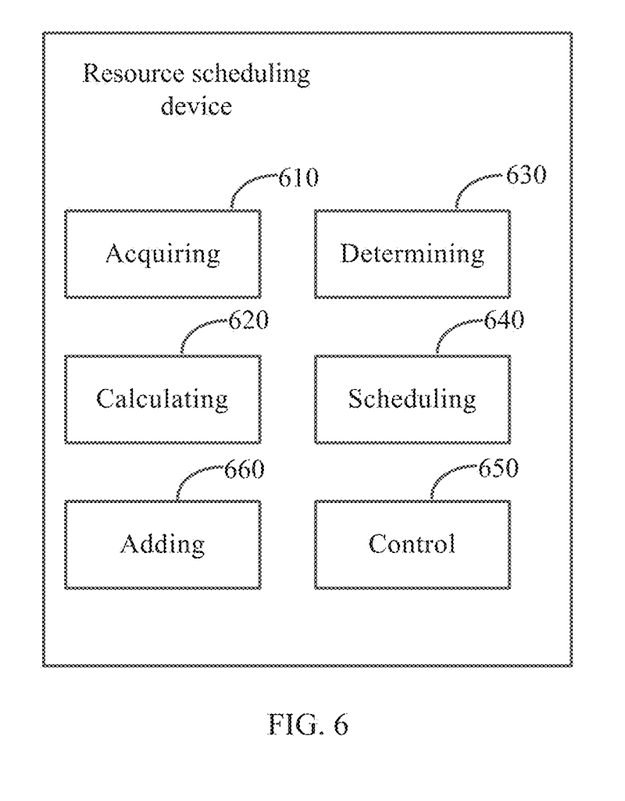
FIG. 6 is a block diagram illustrating a device for resource scheduling according to certain embodiments of the disclosure.

FIG. 6 is a block diagram illustrating an apparatus for resource scheduling according to some embodiments of the disclosure. The apparatus includes an acquiring unit 610, a calculating unit 620, a determining unit 630, a scheduling unit 640, a control unit 650, and an adding unit 660.

The acquiring unit 610 is configured to acquire a resource parameter of the cluster;

The calculating unit 620 is configured to calculate the number of predicted hosts in the cluster according to the resource parameter.

The determining unit 630 is configured to determine to-be-migrated hosts and target hosts from the current hosts in the cluster when the number of current hosts in the cluster is greater than the number of predicted hosts.

The scheduling unit 640 is configured to migrate an instance running on the to-be-migrated host to the target host.

The control unit 650 is configured to control the to-be-migrated host to go offline from the cluster when the instance running on the to-be-migrated host is migrated to the target host.

The adding unit 660 is configured to add a new host to the cluster when the current number of hosts in the cluster is smaller than the number of predicted hosts, the number of new hosts being a difference between the number of predicted hosts and the current number of hosts.

The scheduling unit 640 is further configured to acquire a third host whose actual resource utilization rate exceeds a preset utilization rate threshold from the current hosts in the cluster, and migrate at least one instance running on the third host to the new host, such that neither of the actual resource utilization rates of the third host and the new host exceeds the preset utilization rate threshold.

Figure 7:
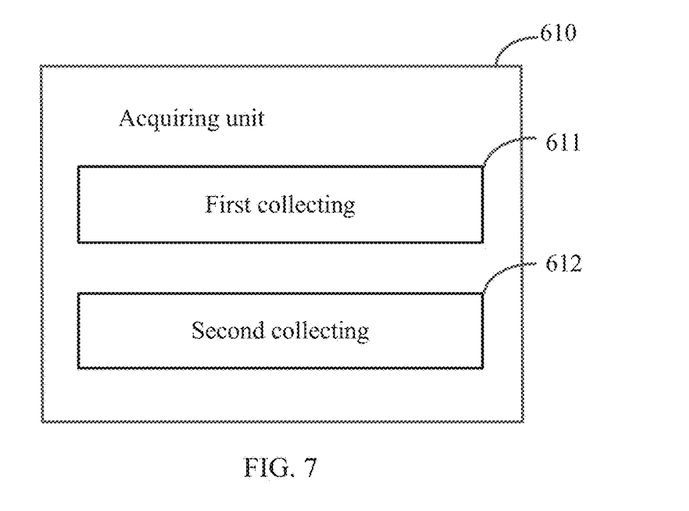
FIG. 7 is a block diagram illustrating an acquiring unit according to certain embodiments of the disclosure.

According to some embodiments, the acquiring unit 610 may include (FIG. 7):

a first collecting unit 611, configured to collect a resource configuration quantity of the host in the cluster; and a second collecting unit 612, configured to collect an actual resource utilization quantity of the instance running on each host in the cluster.

Figure 8:
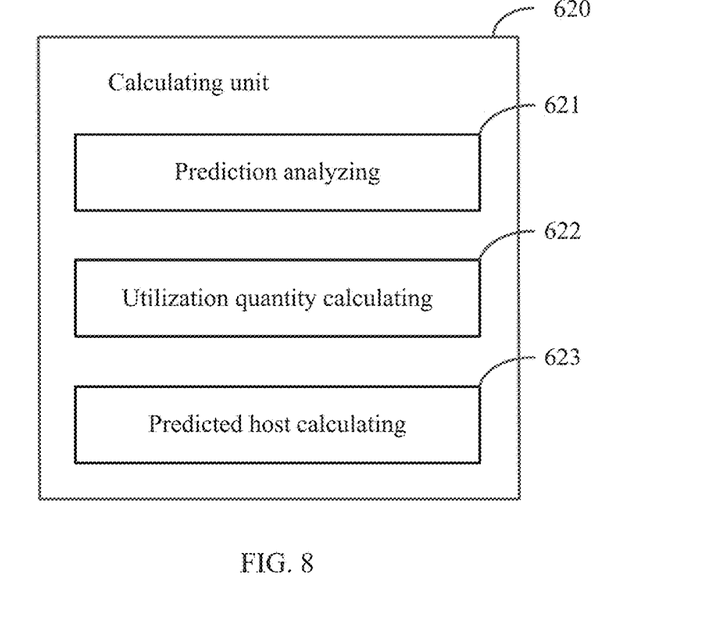
FIG. 8 is a block diagram illustrating a calculating unit according to certain embodiments of the disclosure.

According to some embodiments, the calculating unit 620 may include (FIG. 8):

a prediction analyzing subunit 621, configured to perform linear regression analysis on the actual resource utilization quantity of each instance running on the host, to acquire a predicted resource utilization quantity of each instance;

a utilization quantity calculating subunit 622, configured to calculate a sum of the predicted resource utilization quantities of all the instances running on each host, and use the sum as the predicted resource utilization quantity of each host; and calculate a sum of the predicted resource utilization quantities of all the hosts in the cluster, and use the sum as the predicted resource utilization quantity of the cluster; and a predicted host number calculating subunit 623, configured to calculate the number of predicted hosts in the cluster according to the resource configuration quantities of the hosts and the predicted resource utilization quantity of the cluster.

Figure 9:
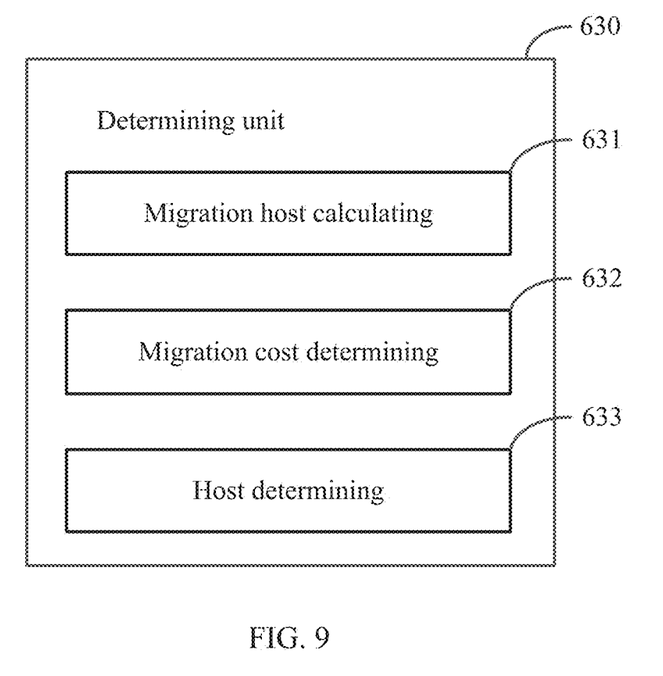
FIG. 9 is a block diagram illustrating a determining unit according to certain embodiments of the disclosure.

According to some embodiments, the determining unit 630 may include (FIG. 9):

a migration host number calculating subunit 631, configured to calculate the difference between the current number of hosts in the cluster and the number of predicted hosts, and use the difference as the number of to-be-migrated hosts in the cluster;

a migration cost determining subunit 632, configured to determine a migration cost value of each host in the cluster; and a host determining subunit 633, configured to acquire a same number of to-be-migrated hosts as the number of the migrated hosts according to a descending order of the migration cost values, and use a same number of remaining hosts as the number of predicted hosts as the target hosts.

According to some embodiments, the migration cost determining circuitry may be specifically configured to: acquire the number of instances running on each host and a total storage space of each instance; calculate a notification migration cost value of each host according to the number of instances, and calculate a data migration cost value of all the instances on each host according to the total storage space; and calculate a sum of the notification migration cost value and the data migration cost value, and use the sum as the migration cost value of each host.

Figure 10:
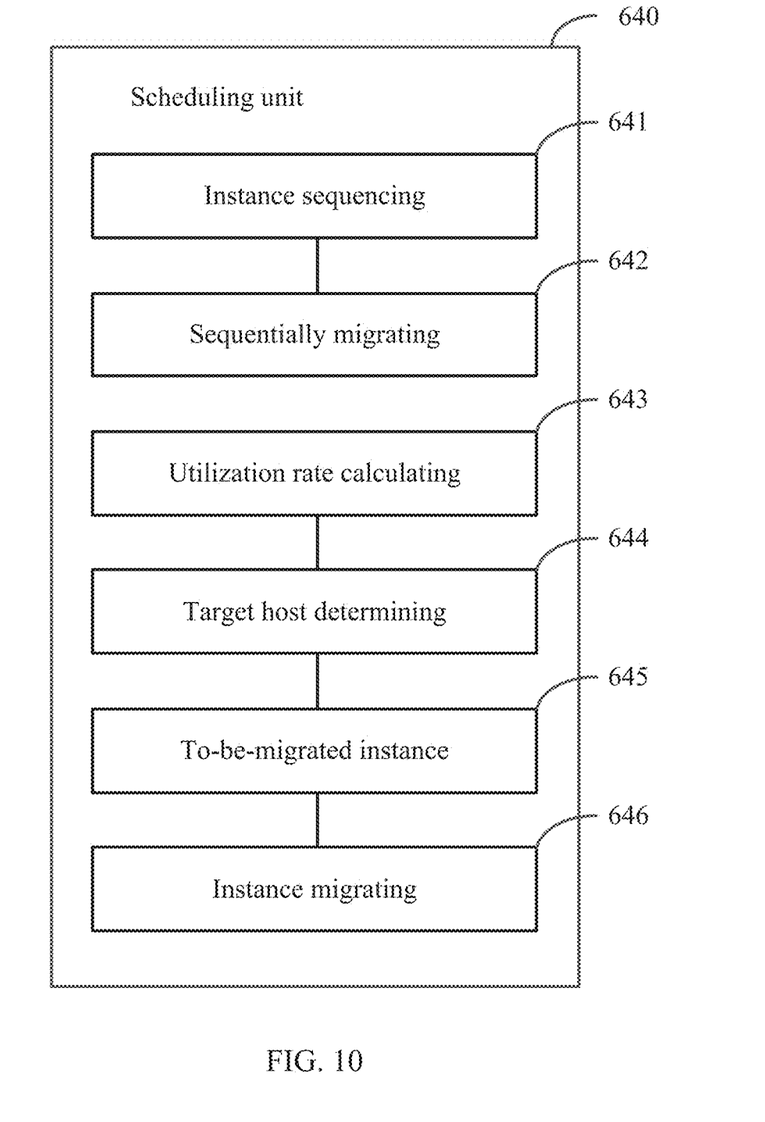
FIG. 10 is a block diagram illustrating a scheduling unit according to certain embodiments of the disclosure.

According to some embodiments, the scheduling unit 640 may include (FIG. 10):

an instance sequencing subunit 641, configured to sequence all the to-be-migrated instances running on the to-be-migrated host according to a descending order of the predicted resource utilization quantities of the instances; and a sequentially migrating subunit 642, configured to sequentially migrate a to-be-migrated instance to a target migration host in the target hosts according to the sequence, the target migration host being a target host whose predicted resource utilization quantity achieves maximum improvement after the to-be-migrated instance is migrated to the target host.

According to some embodiments, the scheduling unit 640 may further include:

a utilization rate calculating subunit 643, configured to calculate an actual resource utilization rate of each target host;

a target host determining subunit 644, configured to determine the target host whose actual resource utilization rate exceeds a preset utilization rate threshold as a first target host, and determine the remaining target hosts as second target hosts;

a to-be-migrated instance acquiring subunit 645, configured to acquire a first to-be-migrated instance from the first target host, such that the actual resource utilization rate of the first target host is smaller than the preset utilization rate threshold when the first to-be-migrated instance is migrated; and an instance migrating subunit 646, configured to migrate the first to-be-migrated instance to the second target host, such that the second target host achieves maximum improvement on the resource utilization rate.

Implementation of functions and functions of various units in the above apparatus can be specifically referred to the implementation of the corresponding steps in the above method in detail, which is not detailed herein.

Since the apparatus embodiments substantially correspond to the method embodiments, the apparatus embodiments are described simply, and the relevant part may be obtained with reference to the part of the description in the method embodiments. The above described apparatus embodiments are merely for illustration purposes only. The units which are described as separate components may be physically separated or may be not physically separated, and the components which are illustrated as units may be or may not be physical units, that is, the components may be located in the same position or may be distributed into a plurality of network units. A part or all the modules may be selected according to the actual needs to achieve the objectives of the technical solutions of the embodiments of the present application. Persons of ordinary skill in the art may understand and implement the present application without paying any creative effort.

As seen from the above embodiment, when scheduling the resources in the cluster in this embodiment, by acquiring a resource parameter of the cluster, calculating a predicted number of hosts in the cluster, determining a to-be-migrated host and a target host from the current hosts in the cluster when the number of current hosts in the cluster is greater than the number of predicted hosts, and migrating an instance running on the to-be-migrated host to the target host, each target host achieves maximum improvement on resource utilization rate, such that the overall resource utilization rate of the cluster is more balanced while the resource demands of the cluster are satisfied with a minimum migration cost.

For the purposes of this disclosure a module or unit is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

Other embodiments of the present application will be apparent to those skilled in the art through consideration of the specification and practice disclosed herein. The present application is intended to cover any variations, uses, or adaptations of the present disclosure following the general principles thereof and including such departures from the present application as coming within common knowledge or customary technical means in the art. It is intended that the specification and examples shall be considered as exemplary only, with a true scope and spirit of the present application being indicated by the appended claims.

What is claimed is:

1. A method for resource scheduling comprising:
   acquiring, by a resource scheduling device, a resource configuration quantity of a cluster, the cluster including a plurality of hosts, the plurality of hosts including a plurality of current hosts each running one or more instances, the resource configuration quantity comprising a total capacity of each host in the cluster;
   acquiring, by the resource scheduling device, an actual resource utilization quantity of each host in the cluster, the actual resource utilization quantity acquired by analyzing resources actively utilized by instances executing on each host;
   generating, by the resource scheduling device, a resource parameter based on the resource configuration quantity and the actual resource utilization quantity;
   calculating, by the resource scheduling device, a number of predicted hosts in the cluster according to the resource parameter by predicting the resource utilization quantities of instances in a given cluster, the predicting generating maximum value of resource utilization quantities of the hosts in a prospective time period based on the corresponding actual resource utilization quantities;
   comparing, by the resource scheduling device, the predicted resource utilization quantities to resource configuration quantities of the plurality of hosts;
   determining, by the resource scheduling device, one or more to-be-migrated hosts and one or more target hosts from the current hosts in the cluster when a number of current hosts in the cluster is greater than the number of predicted hosts; and migrating, by the resource scheduling device, an instance of the one or more instances running on a to-be-migrated host of the one or more to-be-migrated hosts to a target host of the one or more target hosts when the number of current hosts is greater than the number of predicted hosts.

2. The method according to claim 1, wherein the calculating the number of predicted hosts in the cluster comprises:

performing a linear regression analysis on the actual resource utilization quantity of each of the one or more instances running on each of the plurality of current hosts to acquire a predicted resource utilization quantity of each of the one or more instances;

calculating, a sum of the predicted resource utilization quantities of the one or more instances running on each of the plurality of current hosts as a predicted resource utilization quantity of each of the plurality of current hosts;

calculating a sum of the predicted resource utilization quantities of the plurality of current hosts as a predicted resource utilization quantity of the cluster; and calculating the number of predicted hosts in the cluster according to the resource configuration quantities of the plurality of hosts and the predicted resource utilization quantity of the cluster.

3. The method according to claim 2, wherein the determining the one or more to-be-migrated hosts and the one or more target hosts comprises:

calculating a difference between the number of current hosts and the number of predicted hosts as a number of to-be-migrated hosts in the cluster;

calculating a migration cost value for each of the plurality of current hosts; and determining the to-be-migrated hosts in the cluster according to an order of the migration cost values of the plurality of current hosts and the calculated number of to-be-migrated hosts, and a number of remaining current hosts in the cluster as the one or more target hosts.

4. The method according to claim 3, wherein the calculating the migration cost value comprises:

acquiring a number of instances and a total storage space for each of the one or more instances running on each of the plurality of current hosts;

calculating a notification migration cost value for each of the plurality of current hosts according to the number of instances;

calculating a data migration cost value for each of the plurality of current hosts according to the total storage space for each of the one or more instances running; and calculating a sum of the notification migration cost value and the data migration cost value as the migration cost value for each of the plurality of current hosts.

5. The method according to claim 2, further comprising:

sequencing, by the resource scheduling device, all the one or more instances running on the one or more to-be-migrated hosts according to a descending order of the predicted resource utilization quantities of the respective instances when the number of current hosts in the cluster is greater than the number of predicted hosts; and sequentially calculating, by the resource scheduling device when the number of current hosts in the cluster is greater than the number of predicted hosts, a corresponding target migration host of the one or more target hosts for each instance running on the one or more to-be-migrated hosts, the target migration host being a host of the one or more target hosts for which a predicted resource utilization quantity achieves a maximum improvement after the respective instance is migrated to the target migration host, and migrating each instance running on the one or more to-be-migrated hosts to the respective target migration host, wherein the migrating the instance of the one or more instances running on the to-be-migrated host to the target host is migrating a first instance running on a first to-be-migrated host to the corresponding target migration host.

6. The method according to claim 1, further comprising:

controlling, by the resource scheduling device when the number of current hosts in the cluster is greater than the number of predicted hosts, the to-be-migrated host of the one or more hosts to go offline from the cluster when the instance running on the to-be-migrated host is migrated to the target host.

7. The method according to claim 1, further comprising:

calculating, by the resource scheduling device when the number of current hosts in the cluster is greater than the number of predicted hosts, an actual resource utilization rate corresponding to each of the one or more target hosts;

determining, by the resource scheduling device when the number of current hosts in the cluster is greater than the number of predicted hosts, a first target host of the one or more target hosts for which an actual resource utilization rate exceeds a preset utilization rate threshold;

determining, by the resource scheduling device when the number of current hosts in the cluster is greater than the number of predicted hosts, a first to-be-migrated instance from the one or more instances running on the first target host, such that the actual resource utilization rate of the first target host is determined to be smaller than the preset utilization rate threshold after the first to-be-migrated instance is migrated; and migrating, by the resource scheduling device when the number of current hosts in the cluster is greater than the number of predicted hosts, the first to-be-migrated instance to a second target host of the one or more target hosts, the second target host being determined to achieve a maximum improvement on the resource utilization rate after migrating the first to-be-migrated instance.

8. The method according to claim 1, further comprising:

determining, by the resource scheduling device when the number of current hosts is less than the number of predicted hosts, a first current host of the plurality of current hosts for which an actual resource utilization rate exceeds a preset utilization rate threshold;

determining, by the resource scheduling device when the number of current hosts is less than the number of predicted hosts, a group of instances from the one or more instances running on the first current host, such that the actual resource utilization rate of the first current host is determined to be smaller than the preset utilization rate threshold after the group of instances is migrated; and adding, by the resource scheduling device, one or more new hosts from the cluster, when the number of current hosts is less than the number of predicted hosts, a number of the new hosts being equal to a difference between the number of predicted hosts and the number of current hosts, and migrating the group of instances to a second host of the one or more new hosts, the second host being determined such that an actual resource utilization rate of the second host does not exceed the preset utilization rate threshold after migration.

9. A scheduling device for resource scheduling on a cluster including a plurality of hosts, the device comprising:
one or more processors;
a network interface; and
a non-transitory memory storing computer-executable instructions executable by the processor, the instructions causing the device to:
   acquire a resource configuration quantity of the cluster, the cluster including a plurality of hosts, the plurality of hosts including a plurality of current hosts each running one or more instances, the resource configuration quantity comprising a total capacity of each host in the cluster;
   acquire an actual resource utilization quantity of each host in the cluster, the actual resource utilization quantity acquired by analyzing resources actively utilized by instances executing on each host;
   generate a resource parameter based on the resource configuration quantity and the actual resource utilization quantity;
   calculate a number of predicted hosts in the cluster according to the resource parameter by predicting the resource utilization quantities of instances in a given cluster, the predicting generating maximum value of resource utilization quantities of the hosts in a prospective time period based on the corresponding actual resource utilization quantities; and
   comparing the predicted resource utilization quantities to resource configuration quantities of the plurality of hosts;
   determine one or more to-be-migrated hosts and one or more target hosts from the current hosts in the cluster when a number of current hosts in the cluster is greater than the number of predicted hosts; and
   migrate an instance of the one or more instances running on a to-be-migrated host of the one or more to-be-migrated hosts to a target host of the one or more target hosts when the number of current hosts is greater than the number of predicted hosts.

10. The scheduling device according to claim 9, wherein the acquiring instruction further causes the device to:
   collect a resource configuration quantity of each of the plurality of hosts in the cluster; and
   collect an actual resource utilization quantity of each of the one or more instances running on each of the plurality of current hosts in the cluster.

11. The scheduling device according to claim 10, wherein the calculating instruction further causes the device to:
   perform a linear regression analysis on the actual resource utilization quantity of each of the one or more instances running on each of the plurality of current hosts to acquire a predicted resource utilization quantity of each of the one or more instances;
   calculate a sum of the predicted resource utilization quantities of the one or more instances running on each of the plurality of current hosts as a predicted resource utilization quantity of each of the plurality of current hosts;
   calculate a sum of the predicted resource utilization quantities of the plurality of current hosts as a predicted resource utilization quantity of the cluster; and
   calculate the number of predicted hosts in the cluster according to the resource configuration quantities of the plurality of hosts and the predicted resource utilization quantity of the cluster.

12. The scheduling device according to claim 11, wherein the determining instruction further causes the device to:
   calculate a difference between the number of current hosts and the number of predicted hosts as a number of to-be-migrated hosts in the cluster;
   calculate a migration cost value for each of the plurality of current hosts; and
   determine the to-be-migrated hosts in the cluster according to an order of the migration cost values of the plurality of current hosts and the calculated number of to-be-migrated hosts, and a number of remaining current hosts in the cluster as the one or more target hosts.

13. The scheduling device according to claim 12, wherein the calculating the migration cost value instruction further causes the device to:
   acquire a number of instances and a total storage space for each of the one or more instances running on each of the plurality of current hosts;
   calculate a notification migration cost value for each of the plurality of current hosts according to the number of instances;
   calculate a data migration cost value for each of the plurality of current hosts according to the total storage space for each of the one or more instances running; and
   calculate a sum of the notification migration cost value and the data migration cost value as the migration cost value for each of the plurality of current hosts.

14. The scheduling device according to claim 11, wherein the instructions further cause the device to:
   sequence all the one or more instances running on the one or more to-be-migrated hosts according to a descending order of the predicted resource utilization quantities of the respective instances when the number of current hosts in the cluster is greater than the number of predicted hosts; and
   sequentially calculate, by the scheduling device when the number of current hosts in the cluster is greater than the number of predicted hosts, a corresponding target migration host of the one or more target hosts for each instance running on the one or more to-be-migrated hosts, the target migration host being a host of the one or more target hosts for which a predicted resource utilization quantity achieves a maximum improvement after the respective instance is migrated to the target migration host, and migrating each instance running on the one or more to-be-migrated hosts to the respective target migration host, the migrating the instance of the one or more instances running on the to-be-migrated host to the target host comprising migrating a first instance running on a first to-be-migrated host to the corresponding target migration host.

15. The scheduling device according to claim 9, wherein the instructions further cause the device to:
   control, by the scheduling device when the number of current hosts in the cluster is greater than the number of predicted hosts, the to-be-migrated host of the one or more hosts to go offline from the cluster when the instance running on the to-be-migrated host is migrated to the target host.

16. The scheduling device according to claim 9, wherein the instructions further cause the device to:
- calculate, by the scheduling device when the number of current hosts in the cluster is greater than the number of predicted hosts, an actual resource utilization rate corresponding to each of the one or more target hosts;
- determine, by the scheduling device when the number of current hosts in the cluster is greater than the number of predicted hosts, a first target host of the one or more target hosts for which an actual resource utilization rate exceeds a preset utilization rate threshold;
- determine by the scheduling device when the number of current hosts in the cluster is greater than the number of predicted hosts, a first to-be-migrated instance from the one or more instances running on the first target host, such that the actual resource utilization rate of the first target host is determined to be smaller than the preset utilization rate threshold after the first to-be-migrated instance is migrated; and
- migrate, by the scheduling device when the number of current hosts in the cluster is greater than the number of predicted hosts, the first to-be-migrated instance to a second target host of the one or more target hosts, the second target host being determined to achieve a maximum improvement on the resource utilization rate after migrating the first to-be-migrated instance.

17. The scheduling device according to claim 9, wherein the instructions further cause the device to:
- determine, by the scheduling device when the number of current hosts is less than the number of predicted hosts, a first current host of the plurality of current hosts for which an actual resource utilization rate exceeds a preset utilization rate threshold;
- determine, by the scheduling device when the number of current hosts is less than the number of predicted hosts, a group of instances from the one or more instances running on the first current host, such that the actual resource utilization rate of the first current host is determined to be smaller than the preset utilization rate threshold after the group of instances is migrated; and
- add, by the scheduling device, one or more new hosts from the cluster, when the number of current hosts is less than the number of predicted hosts, a number of the new hosts being equal to a difference between the number of predicted hosts and the number of current hosts, and migrating the group of instances to a second host of the one or more new hosts, the second host being determined such that an actual resource utilization rate of the second host does not exceed the preset utilization rate threshold after migration.

18. A non-transitory computer-readable storage medium storing computer-executable instructions thereon that, when executed by a processor of a scheduling device, cause the scheduling device to perform resource scheduling on a cluster including a plurality of hosts, the scheduling comprising:
- acquiring, by the scheduling device, a resource configuration quantity of the cluster, the cluster including a plurality of hosts, the plurality of hosts including a plurality of current hosts each running one or more instances, the resource configuration quantity comprising a total capacity of each host in the cluster;
- acquiring, by the scheduling device, an actual resource utilization quantity of each host in the cluster, the actual resource utilization quantity acquired by analyzing resources actively utilized by instances executing on each host;
- generating, by the scheduling device, a resource parameter based on the resource configuration quantity and the actual resource utilization quantity;
- calculating, by the scheduling device, a number of predicted hosts in the cluster according to the resource parameter by predicting the resource utilization quantities of instances in a given cluster, the predicting generating maximum value of resource utilization quantities of the hosts in a prospective time period based on the corresponding actual resource utilization quantities;
- comparing, by the scheduling device, the predicted resource utilization quantities to resource configuration quantities of the plurality of hosts;
- determining, by the scheduling device, one or more to-be-migrated hosts and one or more target hosts from the current hosts in the cluster when a number of current hosts in the cluster is greater than the number of predicted hosts; and
- migrating, by the scheduling device, an instance of the one or more instances running on a to-be-migrated host of the one or more to-be-migrated hosts to a target host of the one or more target hosts when the number of current hosts is greater than the number of predicted hosts.

19. The non-transitory computer-readable storage medium according to claim 18, the scheduling further comprising
- controlling, by the scheduling device when the number of current hosts in the cluster is greater than the number of predicted hosts, the to-be-migrated host of the one or more hosts to go offline from the cluster when the instance running on the to-be-migrated host is migrated to the target host.

* * * * *